United States Patent [19]

Kamata et al.

[11] Patent Number: 4,564,653

[45] Date of Patent: Jan. 14, 1986

[54] IMPACT MODIFIER AND THERMOPLASTIC RESIN COMPOSITION USING THE SAME

[75] Inventors: Kazumasa Kamata, Koganei; Kazuo Ueda; Kiyokazu Kitai, both of Otake, all of Japan

[73] Assignee: Mitsubishi Rayon Co., Ltd., Tokyo, Japan

[21] Appl. No.: 645,358

[22] Filed: Aug. 29, 1984

[30] Foreign Application Priority Data

Aug. 31, 1983 [JP] Japan ................................. 58-159350
Sep. 21, 1983 [JP] Japan ................................. 58-174878

[51] Int. Cl.[4] ...................... C08L 33/02; C08L 51/00; C08L 51/06
[52] U.S. Cl. ........................................ 525/67; 525/64; 525/69; 525/71; 525/78; 525/80; 525/902
[58] Field of Search ..................... 525/302, 67, 71, 80, 525/902, 78, 64, 69

[56] References Cited

U.S. PATENT DOCUMENTS

| | | | |
|---|---|---|---|
| 4,362,845 | 12/1982 | Kamata et al. | 525/902 |
| 4,387,138 | 6/1983 | Gift | 525/304 |
| 4,393,169 | 7/1983 | Moriwaki et al. | 525/67 |
| 4,461,868 | 7/1984 | Lindner et al. | 525/67 |
| 4,481,330 | 11/1984 | Ohara et al. | 525/67 |
| 4,487,890 | 12/1984 | Kishida et al. | 525/302 |

*Primary Examiner*—Allan M. Lieberman
*Attorney, Agent, or Firm*—Cushman, Darby & Cushman

[57] ABSTRACT

An impact modifier comprising a blend of 100 parts by weight of a multi-layer graft copolymer composed of monomers selected from the group consisting of alkyl acrylates, alkyl methacrylates, aromatic vinyl compounds, vinyl cyanide compounds and butadienes and having a multi-layer structure consisting of at least three layers (A), (B) and (C) in which the glass transition temperature of the polymer composing the outermost layer (A) is 0° C. or below, the glass transition temperature of the polymer composing the second layer (B) from the outermost layer (A) is 60° C. or above and the glass transition temperature of the polymer composing the third layer (C) from the outermost layer (A) is 0° C. or below, each of the layers containing a polyfunctional crosslinking agent in an amount of 0 to 5% by weight based on the weight of the layer, and 0.1 to 20 parts by weight of a copolymer obtained by copolymerizing 3 to 30% by weight of an unsaturated acid monomer and 97 to 70% by weight of a vinyl monomer copolymerizable therewith, and a thermoplastic resin composition having excellent impact resistance and molding workability comprising 3 to 50 parts by weight of the modifier set forth above and 100 parts by weight of a thermoplastic resin.

8 Claims, No Drawings

IMPACT MODIFIER AND THERMOPLASTIC RESIN COMPOSITION USING THE SAME

OBJECT OF THE INVENTION

Field of Industrial Application

This invention relates to an impact modifier capable of affording to resins high impact resistance as well as excellent molding workability, and thermoplastic resin compositions containing said modifier and provided with high impact resistance and excellent molding workability.

DESCRIPTION OF PRIOR ART

Thermoplastic resins, especially vinyl chloride resins (hereinafter referred to as PVC), are widely used as a general-purpose resin, but they are not entirely satisfactory in mechanical properties. For instance, PVC is poor in impact strength, especially in notched impact strength, and a variety of methods have been proposed for improving such impact strength of PVC.

Among these proposals, the most effective method is to mix in PVC a graft copolymer obtained by graft-polymerizing a monomer or monomers such as styrene, methyl methacrylate, acrylonitrile and the like on a conjugated diene elastomer. Such graft copolymers are already commercially available as an impact modifier for PVC and they contribute greatly to the expansion of the range of use of PVC molded products.

On the other hand, these graft copolymers are poor in weather resistance and unsuited for outdoor uses since they contain many doule bonds in the main chain of the elastomer. Various resin compositions improved in weather resistance have been proposed in which a saturated polyalkyl acrylate is used as elastomer and a copolymer prepared by graft-polymerizing an alkyl methacrylate, an aromatic vinyl compound or a vinyl cyanide compound on said elastomer is blended with PVC.

PROBLEMS TO BE SOLVED BY THE INVENTION

In preparation of profile shapes from resins, there are the cases where the material must be molded under the conditions where milling of the material is difficult because of extremely high lubricity, and in such cases, a composition with high impact strength is required. However, there is yet available no impact modifier which is capable of affording a well satisfactory impact strength to the resin compositions. The graft copolymers prepared by graft-polymerizing certain materials having good compatibility with PVC on an elastomer are known as impact modifier. These graft copolymers are uniformly dispersed in PVC to provide an excellent impact resistance when they are worked at high temperatures or when the amount of the lubricant used is relatively small, but such graft copolymers tend to coagulate in PVC and fail to show any significant impact resistance improving effect when they are worked at low temperatures or when a large amount of lubricant is used.

CONSTRUCTION OF THE INVENTION

Means for Solving the Problems

The present inventors have noted that the uniform dispersion of said graft copolymer in PVC conduces greatly to the development of impact strength, and as a result, found that a graft copolymer having a multi-layer structure consisting of at least three layers of which the outermost layer has a glass transition temperature (hereinafter referred to as Tg) of 0° C. or below, the second layer (as counted from said outermost layer) has Tg of 60° C. or above and the third layer has Tg of 0° C. or below, is quite effective as an impact modifier for thermoplastic resins, that is, such multi-layer graft copolymer, when for instance blended with PVC, is easily and quickly melted to promote gelation of the PVC composition and produce a very favorable state of dispersion even under a condition of high lubricity and low shear stress, and further such PVC composition is provided with high impact strength in a wide range of molding conditions, from a condition of low lubricity and high shear stress to a condition of high lubricity and low shear stress as mentioned above. The further studies by the present inventors have led to the finding that an even more excellent impact modifier is provided by blending in said multi-layer graft copolymer a specified amount of a specified copolymer having a specified unsaturated acid monomer or monomers as essential component. Further, such graft copolymer blend is excellent in workability and capable of providing good surface gloss to the moldings, and moreover, if no butadiene is contained, such blended graft copolymer also shows an excellent weather resistance. The present invention was attained on the basis of such novel finding.

Thus, the present invention provides an impact modifier comprising a blend of 100 parts by weight of a multi-layer graft copolymer (1) composed of monomers selected from the group consisting of alkyl acrylates, alkyl methacrylates, aromatic vinyl compounds, vinyl cyanide compounds and butadienes and having a multi-layer structure consisting of at least three layers (A), (B) and (C) in which the glass transition temperature of the polymer constituting the outermost layer (A) is 0° C. or below, the glass transition temperature of the polymer constituting the second layer (B) (second from the outermost layer (A)) is 60° C. or above and the glass transition temperature of the polymer constituting the third layer (C) (third from the outermost layer (A)) is 0° C. or below, each of said layers containing a polyfunctional cross-linking agent in an amount of 0 to 5% by weight based on the weight of each layer, and 0.1 to 20 parts by weight of a copolymer (2) obtained by copolymerizing 3 to 30% by weight of an unsaturated acid monomer and 97 to 70% by weight of a vinyl monomer copolymerizable therewith.

The impact modifier of this invention is a blend of said multi-layer graft copolymer (1) and copolymer (2), and it is essential that said graft copolymer (1) has a multi-layer structure consisting of at least three layers formed by conducting polymerization in at least three stages. The multi-layer structure may consist of four layers in which the fourth layer counted from the outermost layer is composed of a polymer having Tg of 60° C. or above, or may consist of five layers in which the fifth layer counted from the outermost layer is composed of a polymer having Tg of 0° C. or below. In any of these cases, the same impact resistance improving effect is provided.

The group of monomers constituting the multi-layer graft copolymer (1) consists of alkyl acrylates, alkyl methacrylates, aromatic vinyl compounds, vinyl cyanide compounds and butadienes.

The alkyl acrylates are preferably those having 2 to 10 carbon atoms in the alkyl group, such as ethyl acrylate, propyl acrylate, n-butyl acrylate, isobutyl acrylate, hexyl acrylate, octyl acrylate and 2-ethylhexyl acrylate.

The alkyl methacrylates are preferably those having 1 to 4 carbon atoms in the alkyl group, such as methyl methacrylate, ethyl methacrylate, propyl methacrylate, isopropyl methacrylate, t-butyl methacrylate and isobutyl methacrylate. Among them, methyl methacrylate is preferred in view of compatibility with PVC.

As the aromatic vinyl compound used in this invention, styrene is preferred, but it is also possible to use α-substituted styrene, nuclear-substituted styrene and their derivatives such as α-methylstyrene, chlorostyrene, vinyltoluene and the like.

As the vinyl cyanide compound, there may be used acrylonitrile, methacrylonitrile and the like.

1,2-butadiene and 1,3-butadiene may be cited as examples of the butadiene usable as monomer in this invention.

The component of the outermost layer (A) of the multi-layer graft copolymer (1) is selected from said group of monomers such that Tg of the outermost layer (A) itself will become 0° C. or below. The compositional ratios of the monomers used for the outermost layer (A) are typically as follows: 0–100% by weight of an alkyl acrylate, 0–40% by weight of an alkyl methacrylate, 0–40% by weight of an aromatic vinyl compound, 0–20% by weight of a vinyl cyanide compound and 0–100% by weight of a butadiene. If Tg of the outermost layer (A) itself is higher than 0° C., the layer (A) portion of the finally obtained modifier proves to be sluggish to melt, when it is blended with PVC to obtain the molded product, and the desired impact resistance improving effect is hardly obtainable. Alkyl acrylates are preferred to butadienes as normal pressure polymerization is possible in the case of the former.

The outermost layer (A) preferably constitutes 10 to 50% by weight of the whole multi-layer graft copolymer. If this ratio is less than 10% by weight, the impact resistance improving effect provided is insufficient while if the ratio exceeds 50% by weight, there results poor molding workability of the modifier-PVC blend.

The component of the second layer (B) is selected from said monomer group such that this layer will have Tg of 60° C. or above. Accordingly, it is suggested that the monomers be used in this layer (B) in the following ratios: 0–100% by weight of an alkyl methacrylate, 0–100% by weight of an aromatic vinyl compound, 0–30% by weight of a vinyl cyanide compound and 0–20% by weight of an alkyl acrylate. If Tg of the layer (B) is below 60° C., the resulting multi-layer graft copolymer is apt to coagulate in PVC and the product proves poor in impact resistance. An alkyl methacrylate, especially methyl methacrylate is preferred as the layer (B) component in case the resulting modifier is blended with PVC. An aromatic vinyl compound improves fluidity in blending and molding of the modifier with PVC, but use of this compound in an excess amount worsens the compatibility with PVC, resulting in a reduced impact strength of the product. A vinyl cyanide compound serves to promote gelation of the modifier-PVC blend, but use of this compound in an excess amount tends to cause coloring in the course of molding and impairs the molding workability.

The layer (B) preferably constitutes 20 to 60% by weight of the whole multi-layer graft copolymer. If this ratio is less than 20% by weight, there results poor molding workability of the modifier-PVC blends, while if said ratio exceeds 60% by weight, the ratio of the elastomer in the whole multi-layer graft copolymer becomes too small to produce a desired impact resistance improving effect.

The component of the third layer (C) is selected from said monomer group such that this layer (C) will have Tg of 0° C. or below. The compositional ratios of the monomers in the layer (C) are therefore suggested to be as follows: 0–100% by weight of an alkyl acrylate, 0–40% by weight of an alkyl methacrylate, 0–40% by weight of an aromatic vinyl compound, 0–20% by weight of a vinyl cyanide compound and 0–100% by weight of a butadiene. If Tg of the layer (C) is higher than 0° C., the elastic properties of the layer (C) itself are impaired, making it hard to obtain the desired impact resistance improving effect.

The proportion that the layer (C) takes in the whole multi-layer graft copolymer is preferably 10 to 60% by weight. If this ratio is less than 10% by weight, the impact resistance improving effect obtained is small, and if the ratio exceeds 60% by weight, poor molding workability of the modifier-PVC blend results.

The polyfunctional crosslinking agent used in this invention serves not only for facilitating the graft crosslinkage in the production of said multi-layer graft copolymer but also for greatly improving the coagulating characteristic of the emulsion polymer latex. As the polyfunctional crosslinking agent in this invention, there can be used divinylbenzene, esters of acrylic or methacrylic acids and polyhydric alcohols such as diacrylic or dimethacrylic acid esters, triallyl cyanurate, triallyl isocyanurate, allyl acrylate, allyl methacrylate, diallyl itaconate, diallyl phthalate and the like. Among these crosslinking agents, those having an allyl group are preferred in view of their graft crosslinking characteristic.

The ratio of the polyfunctional crosslinking agent in each layer should be in the range of 0 to 5% by weight. If the ratio exceeds 5% by weight, the elastic properties of the outermost layer (A) and/or layer (C), both being an elastomer layer, are too much impaired, while the layer (B), which is a resin layer, is deteriorated in compatibility with PVC. These lead to a reduction of the impact resistance improving effect. In view of the coagulating characteristic of the emulsion polymer latex in the production of multi-layer graft copolymer and the impact resistance improving effect for the obtained multi-layer graft copolymer, it is preferred that the ratio of the polyfunctional crosslinking agent in each layer is in the range of 0.1 to 3% by weight.

The multi-layer graft copolymer in this invention is preferably produced by an ordinary emulsion polymerization method.

As emulsifier, one can use anionic surface active agents such as fatty acid salts, alkylsulfates, alkylbenzenesulfonate, alkyl phosphates, dialkyl sulfosuccinates, etc., nonionic surface active agents such as polyoxyethylene alkyl ethers, polyoxyethylene fatty acid esters, sorbitan fatty acid esters, glycerin fatty acid esters, etc., and cationic surface active agents such as alkylamine salts. These surface active agents can be used singly or in combination. In case pH of the polymerization system shifts to the alkaline side according to the type of the emulsifier used, an appropriate pH adjuster may be used for preventing the hydrolysis of the alkyl acrylate.

As polymerization initiator, commonly employed inorganic initiators such as persulfates or the organic peroxides, azo compounds, etc., can be used. These compounds may be used either singly or in combination with other compounds such as sulfites, hydrogensulfites, thiosulfates, primary metal salts, sodium formaldehyde sulfoxylate and the like to form a redox type initiator. Preferred persulfates for use as initiator in this invention are sodium persulfate, potassium persulfate, ammonium persulfate and the like. Examples of the organic peroxides usable as initiator in this invention are t-butyl hydroperoxide, cumeme hydroperoxide, benzoyl peroxide, lauroyl peroxide and the like.

A chain transfer agent can be used for adjusting the molecular weight of the polymer, and as such chain transfer agent, alkylmercaptans having 5 to 20 carbon atoms can be used.

The polymerization can be carried out at a temperature above the decomposition temperature of the initiator used and under the ordinary emulsion polymerization conditions in such as way that at least the outermost layer (A), second layer (B) and third layer (C) will respectively have the structures such as set forth above. In this invention, the polymerization of any stage can be conducted by adding the whole amount of the monomer or monomer mixture at one time or by continuously supplying the whole amount or a part of the monomer or monomer mixture. However, in view of stability of polymerization and removal of polymerization reaction heat, it is preferred to carry out the polymerization by continuously supplying the whole amount or a part of the monomer or monomer mixture.

The copolymer (2) constituting another component of the impact modifier of this invention is a copolymer obtained by copolymerizing 3 to 30% by weight of an unsaturated acid monomer and 97 to 70% by weight of a vinyl monomer copolymerizable therewith, by employing preferably the emulsion polymerization techniques.

As the unsaturated acid monomer, there can be used the monomers containing acid groups such as acrlylic acid, methacrylic acid, crotonic acid, itaconic acid, cinnamic acid, maleic anhydride, butenecarboxylic acid, etc. If the amount of the unsaturated acid monomer in the copolymer (2) is less than 3% by weight, no satisfactory impact resistance improving effect is provided to the impact modifier produced by blending the copolymer (2) with the afore-described multi-layer graft copolymer (1). On the other hand, if the amount of said unsaturated acid monomer exceeds 30% by weight, the copolymer latex obtained by emulsion polymerization becomes unstable, and also when it is blended with the latex of said multi-layer graft copolymer (1), the latex stability is worsened. The blend may be also deteriorated in its workability.

As the vinyl monomer copolymerizable with said unsaturated acid monomer, one may use alkyl acrylates, alkyl methacrylates, aromatic vinyl compounds and vinyl cyanide compounds, these compounds being usable either singly or in admixture.

In case of producing the copolymer (2) according to emulsion polymerization, it is possible to use the same emulsifier, polymerization initiator and chain transfer agent as used for the production of the multi-layer graft copolymer (1), and also the copolymerization can be accomplished by the same method as used for the preparation of said multi-layer graft copolymer (1).

The impact modifier of this invention is a blend of said multi-layer graft copolymer (1) and copolymer (2), the blending ratio being 0.1 to 20 parts by weight of the copolymer (2) to 100 parts by weight of the multilayer graft copolymer (1). If the amount of the copolymer (2) blended is less than 0.1 part by weight, no satisfactory impact resistance improving effect is provided, while if said amount exceeds 20 parts by weight, the latex blend obtained by blending said both copolymers in the form of latex becomes unstable. Also, when the produced modifier is blended with PVC, the resulting blend may prove poor in workability.

The present invention is practiced by blending said multi-layer graft copolymer (1) and copolymer (2) in the form of latex in the ratio defined above in terms of solid matter, and this latex blend is usually coagulated by salt or acid filtered, washed with water and recovered in the form of powder, or the blend may be spray-dried or freeze-dried for recovering in the form of powder. The recovery can be achieved by using the method disclosed in Japanese Patent Kokai (Laid-Open) No. 187322/82. It is also possible to employ a method in which both multi-layer graft copolymer (1) and copolymer (2) are first worked into powders and blended later. The most preferred method is one in which both copolymers are prepared into a latex blend as said above.

The impact modifier of this invention is mixed in various types of thermoplastic resins to provide them with high impact resistance and excellent workability while bettering the visual appearance of the molded products of these resins. Further, the graft copolymer containing no butadiene shows an excellent weather resistance, too.

The ratio in which the impact modifier of this invention is blended in a thermoplastic resin is preferably in the range of 3 to 50 parts by weight to 100 parts by weight of thermoplastic resin. If the ratio is less than 3 parts by weight, no satisfactory impact resistance improving effect is provided, while if said ratio exceeds 50 parts by weight, the innate mechanical properties of thermoplastic resin may be impaired. The thermoplastic resins in which the impact modifier of this invention can be blended to produce the desired effect include PVC, polycarbonate resins, polyester resins, acrylonitrile-styrene resins, methyl methacrylatestyrene resins and the like. PVC includes, beside polyvinyl chloride, those vinyl chloride copolymers in which vinyl chloride constitutes at least 70% by weight of the whole composition. As the monomers copolymerized with vinyl chloride, there can be used ethylene, propylene, vinyl bromide, vinylidene chloride, vinyl acetate, acrylic acid esters, methacrylic acid esters and the like.

Blending of the impact modifier of this invention and thermoplastic resins is preferably conducted in the form of powder by using a suitable mixing machine such as ribbon blender, Henschel mixer, mixing rolls, banbury mixer, etc., and the blend can be molded by using known molding means such as extruder, injection molding machine, etc. If necessary, known additives such as stabilizer, plasticizer, lubricant, coloring matter, etc., may be properly added in the blend.

The impact modifier of this invention, which contains a specific copolymer having a specific unsaturated acid monomer or monomers as essential component, can produce more excellent effect than the conventional impact modifiers.

The present invention will be described in further detail below by way of the examples thereof. In the Examples shown below, all "parts" and "%" are by weight unless otherwise noted. Tg of the copolymers was determined from the Fox's formula.

EXAMPLE 1

(a) Preparation of multi-layer graft copolymer (1)

In 190 parts of ion-exchanged water, which had been treated with nitrogen to replace the air and placed in a reactor, were dissolved 1.2 part of half-hardened tallow fatty acid soap and 0.6 part of potassium persulfate. Into this solution maintained at 70° C. was added dropwise over a period of one hour a mixture consisting of 19.85 parts of n-butyl acrylate and 0.15 part of triallyl isocyanurate as materials for forming the layer (C). After this one-hour dropwise addition, the mixed solution was maintained at the same temperature (70° C.) for additional one hour to complete the polymerization. The rate of polymerization was 99.0%.

To this polymer latex maintained at 70° C. was further added dropwise over a period of 2 hours a mixture consisting of 49.7 parts of methyl methacrylate and 0.3 part of triallyl isocyanurate which form the layer (B), and the resulting mixed solution was allowed to stand as it was for one hour to complete the polymerization. The rate of polymerization was 99.5%.

To the thus obtained polymer latex was added 0.2 part of potassium persulfate dissolved in 10 parts of water, followed by dropwise addition thereto of a mixture consisting of 29.8 parts of n-butyl acrylate and 0.2 part of triallyl isocyanurate, which are to form the layer (A), over a period of 90 minutes while maintaining the temperature at 70° C. The mixed solution was allowed to stand as it was for one hour to complete the polymerization. The rate of polymerization was 99.3%. The resulting graft copolymer had an average particle size of 0.25 μ.

(b) Preparation of copolymer (2)

Into 200 parts of ion-exchanged water, which had undergone nitrogen replacement and was placed in a reactor, were dissolved 3 parts of half-hardened tallow fatty acid soap and 0.6 part of potassium persulfate, followed by 4-hour dropwise addition of a mixture consisting of 90 parts of ethyl acrylate and 10 parts of methacrylic acid while maintaining the temperature at 70° C. The mixed solution was allowed to stand for 3 hours to accomplish the polymerization, obtaining a copolymer (2) latex. The rate of polymerization was over 99.9%.

(c) Latex blend and polymer recovery 100 parts (calcd. in terms of solid matter) of the multi-layer graft copolymer (1) latex was supplied into a reactor equipped with a stirrer, followed by 10-second addition thereto of 2 parts (as solid matter) of the copolymer (2) latex under stirring, the stirring being further continued for 15 minutes.

The resulting latex mixture was added with an aqueous solution of sulfuric acid and this solution was coagulated by sulfuric acid, washed, dehydrated and then dried to recover the polymer in the form of powder (Example 1-1). A description of this polymer is given in Table 1.

The polymers obtained in the same way but by changing the amount of the copolymer (2) added are also shown in Table 1.

(d) Preparation of polymer-blended vinyl chloride resin compositions

To 100 parts of a vinyl chloride resin having an average polymerization degree of 1,100 were added 1.0 part of tribasic lead sulfate, 0.3 part of dibasic stearic acid, 2.4 parts of lead stearate, 0.3 part of stearic acid, 0.3 part of polyethylene wax and 10 parts of the respective polymers (modifiers) obtained in (c) above, and the materials were mixed in a Henschel mixer by heating to 115° C. to obtain a homogeneous mixture. Each of the thus prepared vinyl chloride resin compositions was molded into a square bar by a 30 mm single-screw extruder under the following conditions:

| Temperature | Cylinder 1<br>150° C. | Cylinder 2<br>165° C. | Cylinder 3<br>180° C. | Die<br>200° C. |
|---|---|---|---|---|
| Screw: | Cr = 3.0, 30 mmφ full-flighted screw | | | |

Impact strength of the moldings was measured according to ASTM D-256 except for use of a test piece with a 2 mm deep U notch. This impact strength evaluation method is common to all the Examples and Comparative Examples which follow. The results of measurement are shown in Table 1.

TABLE 1

| | Multi-layer graft copolymer (1) (parts) | Co-polymer (2) (parts) | Izod impact strength (kg · cm/cm$^2$) | Remarks |
|---|---|---|---|---|
| Comparative Example 1 | 100 | 0.05 | 10.5 | Good powder condition |
| Example 1-1 | 100 | 2 | 36.2 | Good powder condition |
| Example 1-2 | 100 | 6 | 45.1 | Good powder condition |
| Example 1-3 | 100 | 15 | 48.8 | Good powder condition |
| Comparative Example 2 | 100 | 30 | — | Bad powder condition |

As seen from the above results, the impact resistance improving effect of the modifier is increased by blending the copolymer (2) in certain specified amounts.

EXAMPLE 2 (a) Preparation of rubber elastomer (C)

A rubber elastomer (C) was synthesized from the following materials:

| | |
|---|---|
| 1,3-butadiene | 100 parts |
| Divinylbenzene | 0.3 parts |
| Diisopropylbenzene hydroperoxide | 0.2 parts |
| Sodium pyrophosphate | 0.5 parts |
| Ferrous sulfate | 0.01 parts |
| Dextrose | 1.0 parts |
| Potassium oleate | 0.5 parts |
| Water | 200 parts |

A mixture of the above composition was polymerized at 50° C. in a pressure autoclave. The polymerization was completed in 15 hours. The resultantly obtained rubber elastomer had an average particle size of 0.16 μ.

(b) Preparation of multi-layer graft copolymer (1)

To 30 parts (calcd. in terms of solid matter of polymer) of the rubber latex obtained in (a) above was added a solution prepared by dissolving 0.6 part of half-hardened tallow potassium soap and 0.2 part of sodium formaldehyde sulfoxylate in 120 parts of water, and the mixture was heated to 70° C. under stirring. To this latex maintained at 70° C. was added dropwise over a period of 2.5 hours a mixture consisting of 39.8 parts of methyl methacrylate, 0.2 parts of triallyl isocyanurate and 0.15 part of cumene hydroperoxide for forming the layer (B). After this dropwise addition, the mixed solution was left as it was for one hour to complete the first-stage graft polymerization. The rate of polymerization was 99.8%.

To the obtained polymer latex were added 0.3 part of half-hardened tallow potassium soap and 0.2 part of sodium formaldehyde sulfoxylate dissolved in 20 parts of water, followed by 2-hour dropwise addition of a mixture consisting of 29.8 parts of n-butyl acrylate, 0.2 part of triallyl isocyanurate and 0.15 part of cumene hydroperoxide for forming the layer (A) while maintaining the temperature at 70° C. The mixed solution was allowed to stand as it was for one hour to complete the polymerization. The rate of polymerization was 99.6%, and the final graft copolymer had an average particle size of 0.21 μ. In the thus obtained multi-layer graft copolymer (1), Tg of the butadiene elastomer (C) was −85° C., Tg of the layer (B) was 105° C. and Tg of the layer (A) was −54° C.

(c) To 100 parts (as solid matter) of this latex was blended 2 parts (as solid matter) of the copolymer (2) latex obtained in Example 1-(b), and the blend was treated in accordance with Example 1-(c) and (d) to obtain a vinyl chloride composition. Its impact resistance as measured in the same way as in Example 1 is shown in Table 2. Similar vinyl chloride resin compositions were prepared by changing the amount of the copolymer (2) latex added, and their impact resistance determined in the same way was also shown in Table 2.

TABLE 2

|  | Multi-layer graft copolymer (1) (parts) | Copolymer (2) (parts) | Izod impact strength (kg · cm/cm²) | Remarks |
| --- | --- | --- | --- | --- |
| Comparative Example 3 | 100 | 0.05 | 12.3 | — |
| Example 2-1 | 100 | 2 | 48.7 | — |
| Example 2-2 | 100 | 4 | 56.0 | — |
| Example 2-3 | 100 | 15 | 54.1 | — |
| Comparative Example 4 | 100 | 30 | — | Poor workability |

EXAMPLE 3

A multi-layer graft copolymer (1) latex was obtained by following the same process as in Example 1-(a) except that 39.75 parts of 2-ethylhexyl acrylate and 0.25 part of allyl methacrylate were used for forming the layer (C), 27.9 parts of methyl methacrylate, 11.9 parts of styrene and 0.2 part of allyl methacrylate were used for forming the layer (B) and 19.85 parts of 2-ethylhexyl acrylate and 0.15 part of allyl methacrylate were used for forming the layer (A). To 100 parts (as solid matter) of this multi-layer graft copolymer (1) latex was blended 4 parts (as solid matter) of the copolymer (2) latex obtained in Example 1-(b), and the blend was treated according to Example 1-(c) to recover the polymer. This polymer was processed according to Example 1-(d) to obtain a vinyl chloride resin composition. Impact resistance of this composition as determined by the method of Example 1-(d) is shown in Table 3. Also, multi-layer graft copolymer (1) latices were prepared in the same way as in Example 1 except that the type and amount of the monomer (or monomers) and crosslinking agent of each of the layers (C), (B) and (A) were changed, and to 100 parts (as solid matter) of these multi-layer graft copolymer (1) latices was added 4 parts (as solid matter) of the copolymer (2) latex obtained in Example 1-(b) and the blends were treated according to Example 1-(c) and (d) to obtain the vinyl chloride resin compositions. Their impact resistance was determined by the same evaluation method as described above, the results being also shown in Table 3.

TABLE 3

| | Graft copolymer (1), 100 parts (as solid matter) | | | | | |
| --- | --- | --- | --- | --- | --- | --- |
| | Layer (C) | | | Layer (B) | | |
| | Monomer (parts) | Tg (°C.) | Cross-linking agent (parts) | Monomer (parts) | Tg (°C.) | Cross-linking agent (parts) |
| Example 3-1 | 2EHA 39.75 | −50 | AMA 0.25 | MMA/St 27.9/11.9 | 104 | AMA 0.2 |
| Example 3-2 | 2EHA/MMA 39.8/9.9 | −30 | AMA 0.3 | MMA/St 17.9/11.9 | 103 | AMA 0.2 |
| Example 3-3 | 2EHA/MMA 29.9/9.9 | −25 | AMA 0.2 | MMA/AN 24.8/5.0 | 104 | AMA 0.2 |
| Comp. Example 5 | 2EHA/MMA 19.9/29.8 | 23 | AMA 0.3 | MMA/St 14.9/9.9 | 103 | AMA 0.2 |
| Comp. Example 6 | 2EHA 39.75 | −50 | AMA 0.25 | MMA/St 14.9/9.9 | 103 | AMA 0.2 |
| Comp. Example 7 | 2EHA 39.75 | −50 | AMA 0.25 | MMA/2EHA 14.9/9.9 | 23 | AMA 0.2 |

| | Graft copolymer (1), 100 parts (as solid matter) | | | | | |
| --- | --- | --- | --- | --- | --- | --- |
| | Layer (A) | | | | | |
| | Monomer (parts) | Tg (°C.) | Cross-linking agent (parts) | Copolymer (2) (parts) (as solid matter) | Izod impact strength (kg · cm/cm²) | Remarks |
| Example | 2EHA | −50 | AMA | 4 | 42.4 | Good powder |

TABLE 3-continued

| | | | | | | |
|---|---|---|---|---|---|---|
| 3-1 | 19.85 | | 0.15 | | | condition |
| Example 3-2 | 2EHA 19.85 | −50 | AMA 0.15 | 4 | 38.9 | Good powder condition |
| Example 3-3 | 2EHA/MMA 24.8/5.0 | −33 | AMA 0.2 | 4 | 40.6 | Good powder condition |
| Comp. Example 5 | 2EHA 24.8 | −50 | AMA 0.2 | 4 | 21.0 | Good powder condition |
| Comp. Example 6 | 2EHA/MMA 10/24.8 | 42 | AMA 0.2 | 4 | 15.1 | Good powder condition |
| Comp. Example 7 | 2EHA/MMA 24.8/10 | −20 | AMA 0.2 | 4 | — | Bad powder condition |

The abbreviations used in Table 3 are as follows. The same applied hereinafter.
2EHA: 2-ethylhexyl acrylate
MMA: methyl metharylate
St: styrene
AN: acrylonitrile
AMA: allyl methacrylate As noted from the results of Comparative Examples 5 and 6, the impact resistance improving effect is small when Tg of the layer (C) component or layer (A) component is high. As noted from the results of Comparative Example 7, the powder condition is bad when Tg of the layer (B) component is low.

EXAMPLE 4

A copolymer (2) latex was obtained by treating a mixture consisting of 85 parts of butyl acrylate and 15 parts of acrylic acid according to Example 1-(b). 3 parts (as solid matter) of this copolymer (2) latex was blended in 100 parts (as solid matter) of the multi-layer graft copolymer (1) latex obtained in Example 1-(a), and the blend was treated according to Example 1-(c) and (d) to obtain a vinyl chloride composition. Impact resistance of this composition is shown in Table 4. Also shown in Table 4 are the evaluation results of the composition obtained in the same way as said above by changing the composition and amount of the copolymer (2) latex used.

EA: ethyl acrylate
MA: methyl acrylate
MAA: methacrylic acid
CA: crotonic acid

The above results show that an excessively small content of unsaturated acid in the copolymer (2) results in a low impact resistance improving effect while an excessively large content of unsaturated acid deteriorates the latex stability after blending.

EXAMPLE 5

A multi-layer copolymer (1) latex was obtained by following the same process as in Example 1-(a) except that sodium lauroylbenzene sulfonate was used as emulsifier, sodium formaldehyde sulfoxylate was used as catalyst, 29.8 parts of n-butyl acrylate, 0.2 part of triallyl cyanurate and 0.15 part of t-butyl hydroperoxide were used for forming the layer (C), 36.8 parts of methyl methacrylate, 3 parts of acrylonitrile, 0.2 part of triallyl cyanurate and 0.15 part of t-butyl hydroperoxide were used for forming the layer (B), and 29.8 parts of n-octyl acrylate, 0.2 part of triallyl cyanurate and 0.15 part of t-butyl hydroperoxide were used for forming the layer (A).

In 100 parts (as solid matter) of this multi-layer graft copolymer (1) latex was blended 2 parts (as solid matter) of the copolymer (2) latex of Example 1-(b), and the blend was treated according to Example 1-(c) to re-

TABLE 4

| | Graft copolymer (1) (parts) | Copolymer (2) | | Izod impact strength (kg · cm/cm²) | Remarks |
|---|---|---|---|---|---|
| | | Monomer composition (%) | Amount added (parts) | | |
| Example 4-1 | 100 | BA/AA = 85/15 | 3 | 46.6 | Good latex stability |
| Example 4-2 | 100 | BA/IA = 80/20 | 4 | 44.8 | Good latex stability |
| Example 4-3 | 100 | EA/AA = 85/15 | 4 | 39.6 | Good latex stability |
| Example 4-4 | 100 | MA/MAA = 90/10 | 2 | 37.2 | Good latex stability |
| Example 4-5 | 100 | EA/CA = 80/20 | 1.5 | 35.4 | Good latex stability |
| Example 4-6 | 100 | MMA/MAA = 90/10 | 6 | 41.0 | Good latex stability |
| Comparative Example 8 | 100 | BA/AA = 98/2 | 4 | 15.6 | Good latex stability |
| Comparative Example 9 | 100 | BA/AA = 60/40 | 2 | — | Blend latex coagulated |

The abbreviations used in Table 4 are as follows. The same applies hereinafter.
BA: n-butyl acrylate
AA: acrylic acid
IA: itaconic acid cover the polymer. This polymer was treated according to Example 1-(d) to obtain a vinyl chloride resin composition. Impact resistance of this composition was determined by the method of Example 1-(d), the results being shown in Table 5. Similar compositions were also prepared by changing the amount of crosslinking agent and the ratio of monomers alone in each layer, and the evaluation results of their impact resistance were also shown in Table 5.

lent impact resistance improving effect for polycarbonate resin.

EXAMPLE 7

TABLE 5

| | Graft copolymer (1), 100 parts (as solid matter) | | | | | | Copolymer (2) of Example 1-(b) (parts) (solid matter) | Izod impact strength (kg · cm/cm²) |
|---|---|---|---|---|---|---|---|---|
| | Layer (C) | | Layer (B) | | Layer (A) | | | |
| | Monomer (parts) | Cross-linking agent (parts) | Monomer (parts) | Cross-linking agent (parts) | Monomer (parts) | Cross-linking agent (parts) | | |
| Example 5-1 | BA 29.8 | TAC 0.2 | MMA/AN 36.8/3.0 | TAC 0.2 | OA 29.8 | TAC 0.2 | 2 | 38.0 |
| Example 5-2 | BA 29.5 | TAC 0.5 | MMA/AN 36.5/3.0 | TAC 0.5 | OA 29.5 | TAC 0.5 | 2 | 36.5 |
| Example 5-3 | BA 29.7 | TAC 0.3 | MMA/AN 36/3.0 | TAC 1.0 | OA 29.7 | TAC 0.3 | 2 | 39.1 |
| Comp. Example 10 | BA 27 | TAC 3 | MMA/AN 34/3.0 | TAC 3 | OA 27 | TAC 3 | 2 | 11.9 |

The abbreviations used in Table 5, other than those mentioned before, are as follows:
TAC: triallyl cyanurate
OA: n-octyl acrylate As seen from Table 5, a large amount of cross-linking agent in each layer composition results in a small impact resistance improving effect.

EXAMPLE 6

20 parts of the modifier obtained according to Example 1-(a)-(c), 80 parts of a polycarbonate resin, 0.2 part of an antioxidant and 0.1 part of calcium stearate were mixed by a Henschel mixer, and the resulting mixture was pelletized by a 30 mmφ extruder set at cylinder temperature of 240° C. After drying the pelletized product, a test piece was prepared therefrom by an injection molder and its impact strength was measured, the result being shown in Table 6. Also shown in Table 6 are the results obtained with the similarly prepared test pieces but differing in the amount of the copolymer (2).

TABLE 6

| | Graft copolymer (1) (parts) | Copolymer (2) (parts) | Izod impact strength (kg · cm/cm²) |
|---|---|---|---|
| Comparative Example 11 | 100 | 0.05 | 14.3 |
| Example 6-1 | " | 2 | 50.6 |
| Example 6-2 | " | 4 | 52.2 |
| Example 6-3 | " | 15 | 48.4 |

As appreciated from the above results, the modifier compositions according to this invention show an excel- Methyl methacrylate-butadiene-styrene resin (MBS resin), polyethylene chloride (ClPE), both being a commercially available PVC modifier, and the modifier obtained in Example 1-1 were treated according to Example 1-(d) to obtain the corresponding PVC compositions. Weather resistance of these compositions is shown in Table 7. Weather resistance is here represented by Izod impact strength and degree of coloring after an accelerated exposure treatment by a weathermeter.

TABLE 7

| | Modifier | Weather resistance U notched Izod impact strength (kg · cm/cm²) | | | | Degree of coloring after 600-hr accelerated exposure |
|---|---|---|---|---|---|---|
| | | Before exposure | After 100-hr accelerated exposure | After 300-hr accelerated exposure | After 600-hr accelerated exposure | |
| Example 7 | Modifier obtained in Example 1-1 | 36.2 | 33.4 | 32.6 | 29.0 | O |
| Comp. Example 12 | MBS | 28.6 | 15.1 | 8.5 | 7.9 | X |
| Comp. Example 13 | ClPE | 21.2 | 17.5 | 14.3 | 10.7 | Δ |

The degree of coloring in Table 7 was indicated according to the following rating:
O: Almost no coloring occurred. (Good)
Δ: Slight coloring occurred. (Undesirable)
X: Evident coloring occurred. (Bad)

The results of Table 7 indicate very excellent weather resistance (initial impact retention and color fastness) of the modifier according to this invention in comparison with commercial MBS and ClPE.

What is claimed is:
1. An impact modifier comprising a blend of
100 parts by weight of a multi-layer graft copolymer (1) composed of monomers selected from the group consisting of alkyl acrylates, alkyl methacrylates, aromatic vinyl compounds, vinyl cyanide compounds and butadienes and having a multi-layer structure consisting of at least three layers (A), (B) and (C) in which
the polymer constituting the outermost layer (A) has a glass transition temperature of 0° C. or below, said outermost layer (A) constituting 10 to 50% by weight of the multi-layer graft copolymer;

the polymer constituting the second layer (B) from said outermost layer (A) and has a glass transition temperature of 60° C. or above, said second layer (B) constituting 20 to 60% by weight of the multi-layer graft copolymer; and the polymer constituting the third layer (C) from said outermost layer (A) has a glass transition temperature of 0° C. or below, said layer (C) constituting 10 to 60% by weight of the multi-layer graft copolymer;

each of said layers containing a polyfunctional crosslinking agent in an amount of 0 to 5% by weight of the layer, and 0.1 to 20 parts by weight of a copolymer (2) obtained by copolymerizing 3 to 30% by weight of an unsaturated acid monomer selected from the group consisting of acrylic acid, methacrylic acid, crotonic acid, itaconic acid, cinnamic acid, maleic anhydride and butenecarboxylic acid and 97 to 70% by weight of a vinyl monomer copolymerizable therewith selected from the group consisting of alkyl acrylates, alkyl methacrylates, aromatic vinyl compounds and vinyl cyanide compounds.

2. An impact modifier according to claim 1, wherein the multi-layer graft copolymer has a structure in which the outermost layer (A) is constituted by a polymer composed of 95 to 100% by weight of at least one monomer selected from said monomer group so that the glass transition temperature of the polymer constituting said layer (A) will become 0° C. or below and 0 to 5% by weight of a polyfunctional crosslinking agent, said outermost layer (A) constituting 10 to 50% by weight of the multilayer graft copolymer; the second layer (B) from said outermost layer (A) is constituted by a polymer composed of at least one monomer selected from said monomer group so that the glass transition temperature of the polymer constituting said layer (B) will become 60° C. or above and 0 to 5% by weight of a polyfunctional crosslinking agent, said second layer (B) constituting 20 to 60% by weight of the multi-layer graft copolymer; and the third layer (C) from said outermost layer (A) is constituted by a polymer composed of at least one monomer selected from said monomer group so that the glass transition temperature of the polymer constituting said layer (C) will become 0° C. or below and 0 to 5% by weight of a polyfunctional crosslinking agent, said layer (C) constituting 10 to 60% by weight of the multi-layer graft copolymer.

3. A thermoplastic resin composition having excellent impact resistance and molding workability, comprising 100 parts by weight of a thermoplastic resin and 3 to 50 parts by weight of the impact modifier set forth in claim 1.

4. A thermoplastic resin composition according to claim 3, wherein the thermoplastic resin is a vinyl chloride resin.

5. A thermoplastic resin composition according to claim 3, wherein the thermoplastic resin is a polycarbonate resin.

6. A thermoplastic resin composition according to claim 3, wherein the thermoplastic resin is a polyester resin.

7. A thermoplastic resin composition according to claim 3, wherein the thermoplastic resin is an acrylonitrile-styrene resin.

8. A thermoplastic resin composition according to claim 3, wherein the thermoplastic resin is a methyl methacrylate-styrene resin.

* * * * *